(12) United States Patent
Kaplan (10) Patent No.: US 7,123,800 B2
(45) Date of Patent: Oct. 17, 2006

(54) INTEGRATED LOOP RESONATOR WITH ADJUSTABLE COUPLINGS AND METHODS OF USING THE SAME

(75) Inventor: Arkady Kaplan, Rockville, MD (US)

(73) Assignee: Celight, Inc., Silver Spring, MD (US)

( * ) Notice: Subject to any disclaimer, the term of this patent is extended or adjusted under 35 U.S.C. 154(b) by 94 days.

(21) Appl. No.: 11/069,917

(22) Filed: Feb. 28, 2005

(65) Prior Publication Data

US 2005/0196103 A1    Sep. 8, 2005

Related U.S. Application Data

(60) Provisional application No. 60/549,428, filed on Mar. 2, 2004.

(51) Int. Cl.
*G02B 6/42* (2006.01)
(52) U.S. Cl. ............................. 385/50; 385/32; 398/59
(58) Field of Classification Search ...................... None
See application file for complete search history.

(56) References Cited

U.S. PATENT DOCUMENTS

| 4,695,121 A * | 9/1987 | Mahapatra et al. ........... 385/40 |
| 2004/0126054 A1* | 7/2004 | Griffel ........................... 385/15 |
| 2004/0202430 A1* | 10/2004 | Scheuer et al. ................ 385/50 |

OTHER PUBLICATIONS

Armenise, et al., Modeling and Design of a Novel MiniaturizedIintegrated Optical Sensor for Gyroscope Systems, Journal of Lightwave Technology, vol. 19, No. 10, pp. 2-20, Oct. 2001.

Becker, et al., Advanced Ti:Er:LiNbO3 Waveguide Lasers, IEEE Journal of Selected Topics in Quantum Electronics, vol. 6, No. 1, pp. 101-113, Jan./Feb. 2000.

Boy et al., Sensitive Disk Resonator Photonic Biosensor, Applied Optics, vol. 40, No. 31, pp. 5742-5747, Nov. 1, 2001.

Little, et al., Very High-Order Microring Resonator Filters for WDM Applications, IEEE Photonics Tchnology Letters, vol. 16, No. 10, pp. 2263-2265, Oct. 2004.

Madsen, General IIR Optical Filter Design for WDM Application using All-Pass Filters, Journal of Lightwave Technology, vol. 18, No. 6, pp. 860-868, Jun. 2000.

Little, et al., Theory of Loss and Gain Trimming of Resonator-Type Filters, IEEE Photonics Technology Letters, vol. 12, No. 6, pp. 636-638, Jun. 2000.

Schmidt, et al., Directional Coupler Switches, Modulators and Filters Using Alternating $\Delta\beta$ Techniques, IEEE Transactions on Circuits and Systems, vol. CAS-26, No. 12, pp. 1099-1108, Dec. 1979.

(Continued)

*Primary Examiner*—Sung Pak
(74) *Attorney, Agent, or Firm*—Heller Ehrman LLP; Paul Davis (57) ABSTRACT

An integrated optical device with a loop resonator is provided, having at least one closed waveguiding loop which has losses. A coupler and at least one input waveguide is coupled to the loop resonator, An adjustment unit controls a coupling coefficient $K_1$ of the coupler, and a second coupler is coupled to the loop resonator. At least one output waveguide is coupled with the second coupler to the loop resonator. Another adjustment unit is configured to control coupling coefficient $K_2$ of the second coupler, being related to the value of $K_1$, accordingly to the following equation $K_2 = f\{K_1, \xi\}$, providing $Q\{K_2\} = \text{Max}\{Q\}$, where $(1-\xi)$ are the total optical losses within the loop resonator and Q is a resonator characteristic.

38 Claims, 8 Drawing Sheets

OTHER PUBLICATIONS

Yariv, Universal Relations for Coupling of Optical Power Between Microresonators and Dielectric Waveguides, Electronics Letters, vol. 36, No. 4, pp. 321-322, Feb. 2000.

Ilchenko, et al., Whispering gallery mode electro-optic modulator and photonic microwave receiver, J. Opt. Soc. Am. B, vol. 20, No. 2, Feb. 2003, pp. 333-342.

Chen, et al., Tunable lithium niobate waveguide loop, IEEE Photonoics Technology Letters, vol. 16, No. 9, Sep. 2004, pp. 2090-2092.

Cohen, et al., Microphotonic modulator for microwave receiver, Electronics Letters, vol. 37, No. 5, pp. 300-301.

* cited by examiner

INTEGRATED LOOP RESONATOR WITH ADJUSTABLE COUPLINGS AND METHODS OF USING THE SAME

The present invention claims the benefit of U.S. Provisional patent application Ser. No. 60/549,428 filed Mar. 2, 2004.

FIELD OF INVENTION

The present invention relates generally to the integrated optical devices, and their methods of use, that have waveguide loop (ring) resonators, and more particularly to integrated optical devices, and their methods of use, that have adjustable characteristics and are useful for modulating, wavelength filtering, routing, light modulation, switching, lasing, multiplexing/demultiplexing, frequency comb generation and sensing

BACKGROUND

In the expanding integrated optical technology, a number of discrete structures have been proposed to serve as optical building blocks for controlling optical signals of specific wavelengths. Such structures include devices with circular, ring, disc, or sphere shaped active or passive cavities, which are useful components for wavelength filtering, routing, switching, lasing, modulation, multiplexing/demultiplexing, and sensing applications.

Loop or ring resonators are well known integrated waveguide components, see for example cascaded ring resonator described in, C. K. Madsen, "General IIR optical filter design for WDM applications using all-pass filters," IEEE J. Lightwave Technol., Vol. 18, pp. 860–868, 2000.

Figure 1:
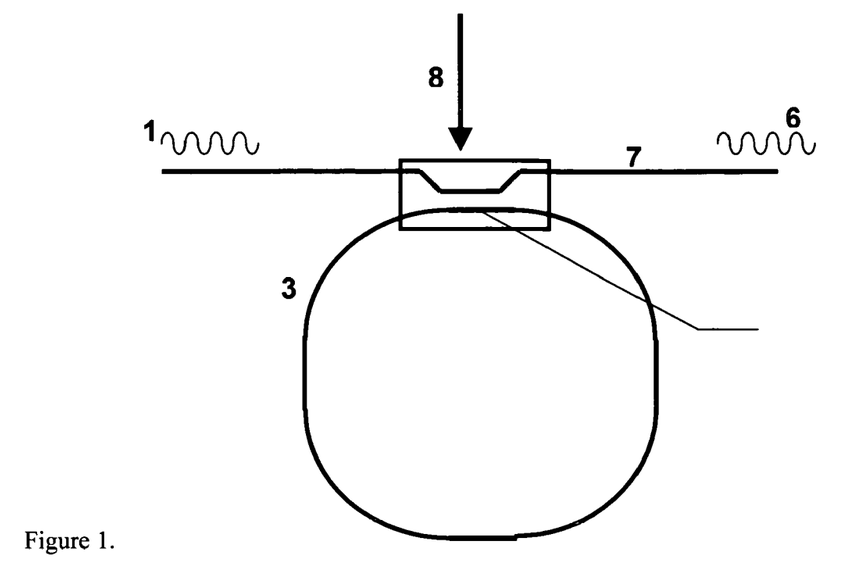
FIG. 1 is a schematic diagram illustrating a prior art loop resonator with adjustable coupling.

The basic schematic diagram of this device shown in FIG. 1. An input beam 1 propagates in an input waveguide 2. This waveguide 2 is coupled to a loop resonator 3 by a coupler 4 that has an adjustment (tuning) element 5. An output signal 6 from an output waveguide 7 varies correspondingly to a driving signal 8 applied to the adjustment element 5.

Figure 2:
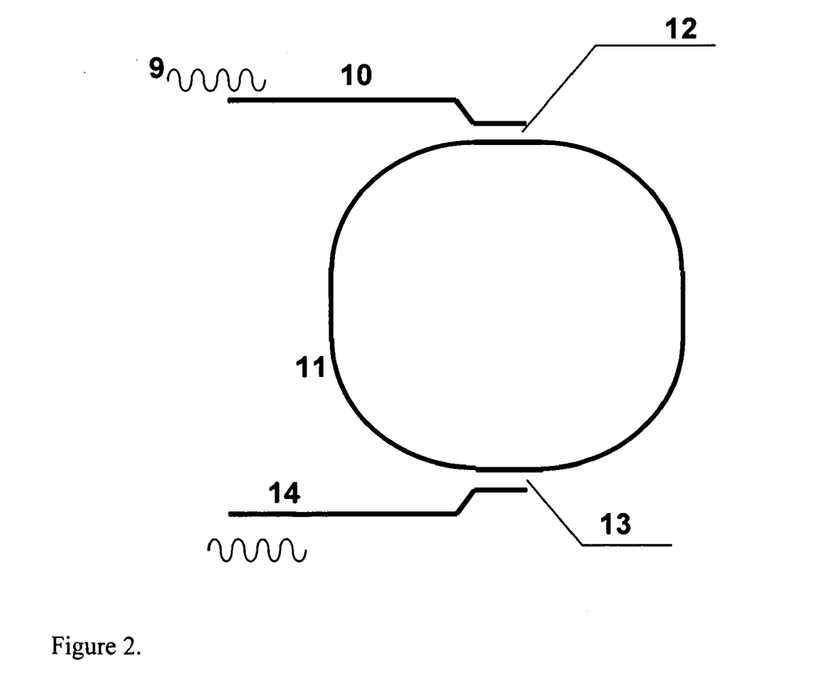
FIG. 2 is a schematic diagram of a prior art loop resonator with separate input and output waveguides.

Integration of two couplings to the same loop resonator thus separating an input and output waveguides is also well known in prior art. See for example, FIG. 4 in the U.S. Pat. No. 6,856,641, incorporated herein by references. The schematic basic element of such device is shown in FIG. 2. An input beam 9 propagates along an input waveguide 10. The input waveguide 10 is coupled to a loop resonator 11 by a first coupler 12. A second coupler 13 connects the loop resonator 11 and an output waveguide 14. An output beam 15 depends on coupling ratios of the couplings 12 and 13. Note that the couplers 12 and 13 have the same characteristics in prior art. No separate tuning of the coupling parameters elements was suggested.

Passive or active loops have been realized in material structures such as glass, lithium niobate (LN), polymer-waveguides, doped silica waveguide, optical fibers and others. Most of the proposed micro-ring structures are based on micro-ring waveguide with a large lateral index contrast (air-substrate) such as whispering-gallery-mode (WGM) cavities. Having small diameters and relatively small bending loss, the strongly guiding micro-cavity can be up to orders of magnitude smaller than the weakly guiding waveguide, such as, for example, of LN Ti-indiffused technology.

The major physical design characteristics underlying such performance criteria as FSR, quality-factor, transmission at resonance, and extinction ratio, are the size and material of the cavity, wavelength, the input and output coupling ratio(s) (analogue of a Fabry-Perot etalon reflectivities), as well as the various components of losses, including coupling, scattering from surface irregularities, bending radiation loss, substrate leakage loss or whispering gallery loss, Raleigh scattering, and absorption due to molecular resonances.

The critical gaps, separating the micro-ring cavity from the tangential waveguides or fibers, determine the input and output coupling ratios of the resonator, which, in turn, define the magnitude of the finesse and the at-resonance transmittance. Because of the high optical confinement and short coupling distances, the coupling coefficients are not readily tuned once the device is fabricated, especially in an independent fashion. Tuning of the refractive index typically serves only to adjust the resonant frequencies. In particular, it is difficult to ensure that the two coupling gaps/lengths on two sides of the resonator cavity are matched. The finesse and the extinction ratio of the resonator would be impaired if the coupling factors and resonator phase are not matched for desirable conditions. Such a coupling management problem is relevant also for add/drop coupling in disk/sphere-shaped cavities having proximity-coupled tapered fiber or prisms, see, for example, "Microphotonic modulator for microwave receiver" by D. A. Cohen, M. Hossein-Zadeh, and A. F. J. Levi in Electron. Lett., vol. 37, pp. 300–301, 2001.

In general, while providing the high-density integration potential, small dimensions make efficient adjustments of cavity parameters a challenging task, limiting their direct implication within various optical systems. Alternative methods may require adjustments of intrinsic gain or loss (i.e. rate of energy flow), thus modifying the response shape or use of thermal tuning, see, for example, B. E. Little and Sai T. Chu, "Theory of loss and gain trimming of resonator-type filters", IEEE Photonics Technol. Lett., Vol. 12, No. 6, pp. 636–638, 2000. The speed and accuracy of thermal tuning, however, are not sufficient for high-speed applications.

Recently, Y-junction reflectors were proposed for effective change in propagation direction in weakly guided planar Ti-diffused LN structures "Tunable lithium niobate waveguide loop" by J. X. Chen at al IEEE Photonics Technol. Lett., Vol. 16, 2090–2092, 2004. In such embodiments, potentially, the add/drop coupling ratios can be readily tuned independently via applied electric fields along with the resonance frequency of the loop. Thus, the speed/accuracy and, as a result, applicability can be much improved over those obtained with thermal or electro-optical tuning with inseparable controls of cavity parameters (coupling and phase), such as, LN-based WGM cavities. Weakly guided technology also may mitigate the additional problem of fiber/waveguide alignment, which should provide an effective coupling between fiber and the micro-cavity and vise versa.

The generic unidirectional coupling between a ring resonator and a waveguide was discussed in the prior art and basic equations describing the manipulation of coupling between optical waveguides and microresonators were obtained for the case of the lossless cavity and/or simplified coupling operator model. For instance, it was shown in A. Yariv, "Universal relations for coupling of optical power between micro-resonators and dielectric waveguides," Electronics letters, Vol.36, No.4, pp. 321–322, 2000, that full transfer of power from the input port to the output port occurs when the two following conditions are satisfied: 1) all internal losses are negligible, and 2) couplings between the cavity and two waveguides are identical.

Reported methods for adjustable coupling are limited to single coupler tuning by using thermal or electro-optical perturbations of the refractive index, which is inseparable with the cavity phase change. Another reported techniques include additional phase matching structures (e.g. gratings) installed near coupled guides, e.g. waveguides, prisms (half blocks), or (tapered) fibers. Immersing the resonator cavity couplers in liquids may also improve the coupling by reducing the optical fiber modes confinement. Alternatively, the angle of light incidence with respect to the normal of the coupling face could be controlled. U.S. Pat. No. 6,393,186 suggests using "athermal" waveguides and couplers in order to separate thermal phase modulation (considered to be parasitic) and coupling modulation, which is done specifically by thermo-grating elements.

Coupling elements of $\delta\beta$-reversal coupler configuration are disclosed in, "Directional coupler switches, modulators, and filters using alternating $\Delta\beta$ techniques" by R. Schmidt, R. Alferness in IEEE Trans. on Circuits and Systems, Vol. 26, No. 12, pp, 1099–1108, 1979. The $\delta\beta$-reversal couplers may have advantages in terms of at-resonance stabilization of the structure since they are not introducing undesired phase shift to the cavity wave.

None of the above described prior art technologies proposed a separate adjustment of coupling ratios of the input and output waveguides coupled to a loop resonator with losses. This fact limits boundaries of loop resonator structures not allowing dynamic, such as real time, optimization of resonator output/performance. In addition, lack of mentioned resonators tunability disables an effective compensation of fabrication errors and/or changes in environmental conditions, thus decreasing the manufacturing yield and productivity.

There is a need for integrated optical devices that allow compensating of losses inherent to loop resonator structures. This compensation must be dynamic to follow changing environmental conditions.

SUMMARY OF THE INVENTION

Accordingly, an object of the present invention is to provide devices, and their methods of use, for real time compensation of losses and changes in the integrated optical devices with loop resonator structures and optimization of their output/performance.

Another object of the present invention is to provide devices, and their methods of use, for generation of a laser beam.

Still another object of the present invention is to provide devices, and their methods of use, for generation of a light beam with a set of frequencies equidistantly apart from each other.

Yet another object of the present invention is to provide devices, and their methods of use, for modulating a light beam.

Another object of the present invention is to provide devices, and their methods of use, for spectral filtering of the input light beam and providing a narrowband output light.

A further object of the present invention is to provide devices, and their methods of use, for optical sensing of environmental parameters such as temperature, material concentration and angle velocity of an interrogated object.

These and other objects of the present invention are achieved in an integrated optical device that includes a loop resonator with at least one closed waveguiding loop. The loop resonator has losses. A coupler is coupled to the loop resonator. At least one input waveguide is coupled with a first coupler to the loop resonator. A first adjustment unit is provided to control a coupling coefficient $K_1$ of the first coupler. A second coupler is coupled to the loop resonator. At least one output waveguide is coupled with the second coupler to the loop resonator. The second adjustment unit is configured to control a coupling coefficient $K_2$ of the second coupler, being related to the value of $K_1$, accordingly to the following equation:

$$K_2 = f\{K_1, \xi\}, \text{ providing } Q\{K_2\} = \text{Max}\{Q\},$$

where $(1-\xi)$ are the total optical losses within the loop resonator and Q is a resonator characteristic.

In another embodiment of the present invention, a method for creating an integrated optical device provides a loop resonator that has losses. The loop resonator is coupled to an input and output waveguides with a first and a second couplers. First and second adjustment units are incorporated with the first and the second couplers. The first and the second adjustment units are driven independently. The second adjustment unit is driven to control a coupling coefficient $K_2$ of the second coupler, with $K_2$ being related to the value of a coupling coefficient $K_1$ of the first coupler, accordingly to the following equation:

$$K_2 = f\{K_1, \xi\}, \text{ providing } Q\{K_2\} = \text{Max}\{Q\},$$

where $(1-\xi)$ are the total optical losses within the loop resonator and Q is a resonator characteristic.

BRIEF DESCRIPTION OF THE DRAWINGS

FIG. 5 is a schematic diagram illustrating one embodiment of the present invention of the integrated optical device with two input waveguides and two output waveguides.

DETAILED DESCRIPTION OF THE PREFERRED EMBODIMENT

Figure 3:
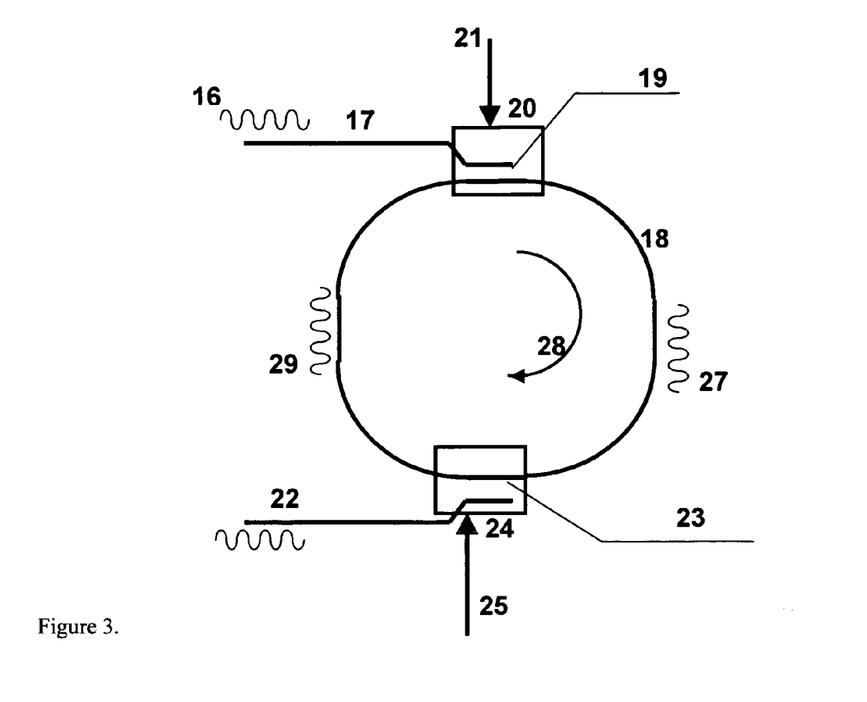
FIG. 3 is a schematic diagram illustrating one embodiment an integrated optical device with two adjustable couplers of the present invention that connects a loop resonator with an input and output waveguides.

In one embodiment of the present invention, an optical device is provided, the block diagram of which is shown in FIG. 3, an input beam 16 propagates along an input waveguide 17. The input waveguide 17 is coupled to a loop resonator 18 by a first coupler 19 that has a first adjustment (tuning) unit 20. A driving signal 21 is applied to the first adjustment unit 20 to change a coupling ratio $K_1$ of the first coupler 19. An output waveguide 22 is coupled to the loop resonator 18 by a second coupler 23 that has a second adjustment unit 24. A driving signal 25 is applied to the second adjustment unit 24 to change a coupling ratio $K_2$ of the second coupler 23. An output beam 26 from the output waveguide 22 varies corresponding to the driving signals 21 and 25 applied to the adjustment units 20 and 25. The optimal value of $K_2$ depends on the value of $K_1$ according to the following equation:

$$K_2=f\{K_1,\xi\}, \text{ providing } Q\{K_2\}=\text{Max}\{Q\}, \quad (1)$$

where (1-ξ) are the total optical losses within the loop resonator 18 and Q is a resonator output characteristic.

The resonator output characteristic Q is selected from a resonator contrast, aresonator quality-factor, resonator finesse, spectral line-width, and combination of the above. More detailed description of the relationship between the coupling ratios $K_1$ and $K_2$ for the best loop resonator performance is provided further in the text.

In one embodiment of the present invention, the optical loop (cavity) 18 operates in the following way. The input beam 16 propagating along the input waveguide 17 is partially coupled to the resonator waveguide 18 forming the resonant loop. An arrow 28 shows the direction of propagation of a light beam 27 inside the loop. The percentage of light that is coupled from the input waveguide 17 into the loop resonator 18 is determined by the coupling ratio $K_1$, which is a characteristic of the first coupler 19. Once the light beam 27 reaches the second coupler 23, it splits into two beams according to the coupling ratio $K_2$. One part of the light beam 27 continues to propagate along the loop-waveguide 18 forming a light beam 29, and another part of the light beam 27 is coupled to the output waveguide 22 forming the output beam 26. When the light beam 29 reaches the first coupler 19, it is partially continues propagation along the resonant loop 18 contributing into the light beam 27. The percentage of the light beam 29 that contributes the light beam 27 depends on the coupling ratio $K_1$. There are several solutions for release of the light energy that is not coupled into the resonant loop 18 at the first coupler 19. One of the embodiments will be disclosed later in the invention description when describing FIG. 4. The light is trapped in its propagation inside the loop resonator 18, permanently releasing its portions via the second coupler 23 thus forming the output beam 26 as the result of interference of multiple beams coupled from the loop each time light passes this second coupler 23.

In one embodiment of the present invention, an integrated optical device is provided that has an optical loop resonator 18 connected by first 19 and a second couplers 23 to at least one input waveguide 17 and at least one output waveguide 22. These couplings 19 and 23 can be realized by different technology and/or on substrates with different characteristics, including but not limited to, electro-optical, thermo-optical, acousto-optical, or opto-mechanical. The first 20 and second 24 adjustment units control parameters of the first 19 and second 23 couplers independently. In this embodiment, two independently controlled couplers 19 and 23 are provided for the input 17 and output 22 waveguides of the integrated optical device.

In one embodiment of the present invention, a lossy resonator cavity 18 is provided with independently adjustable the first 19 and the second 23 couplings that need not be identical, positioned between the cavity and input/output guides. The non-identical values of coupling optimize the resonator response for the lossy resonator. Coupling ratios of the first 19 and second 23 couplers are different. The second coupling ratio $K_2$ is dependent on the first coupling ratio $K_1$ according to the following equation:

$$K_2=f\{K_1,\xi\}, \text{ providing } Q\{K_2\}=\text{Max}\{Q\}, \quad (2)$$

where (1-ξ) are total optical losses within the loop resonator 18 and Q is a resonator characteristic. The resonator characteristic Q is selected from at least one of, a resonator contrast, a resonator quality-factor, a resonator finesse, and a spectral line-width.

Figure 4:
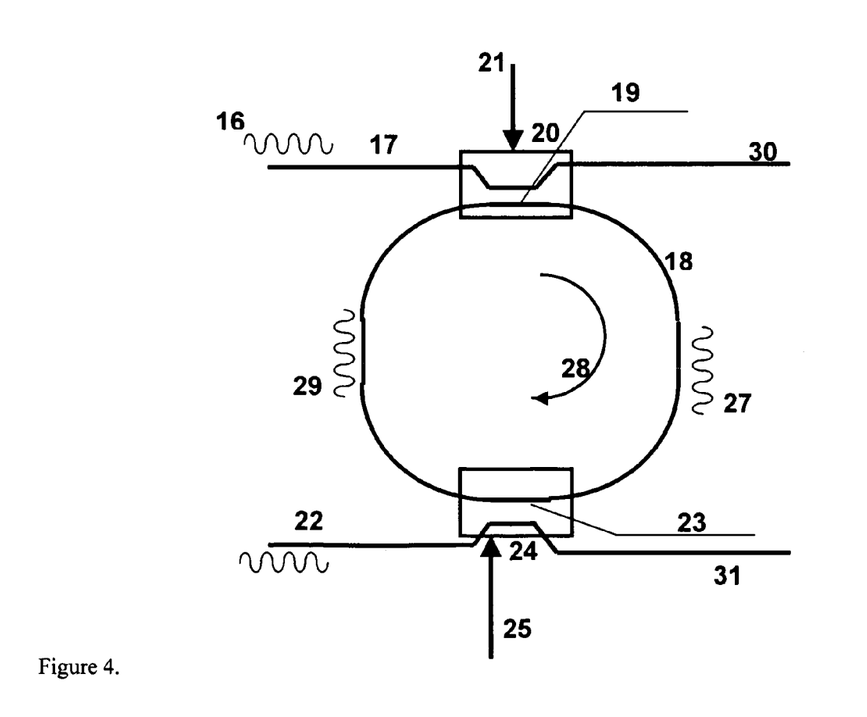
FIG. 4 is a schematic diagram illustrating one embodiment of the integrated optical device of the present invention with additional input and output waveguides.

Another embodiment of the present invention is shown in FIG. 4, which illustrates an additional output waveguide 30 and input waveguide 31. Introduction of these two waveguides 30 and 31 is beneficial giving an opportunity to release or insert light energy. For example, when the light beam 29 passes the first coupler 19, the part of the beam continues its propagation along the loop waveguide 18, while another part outputs through the waveguide 30.

Figure 5:
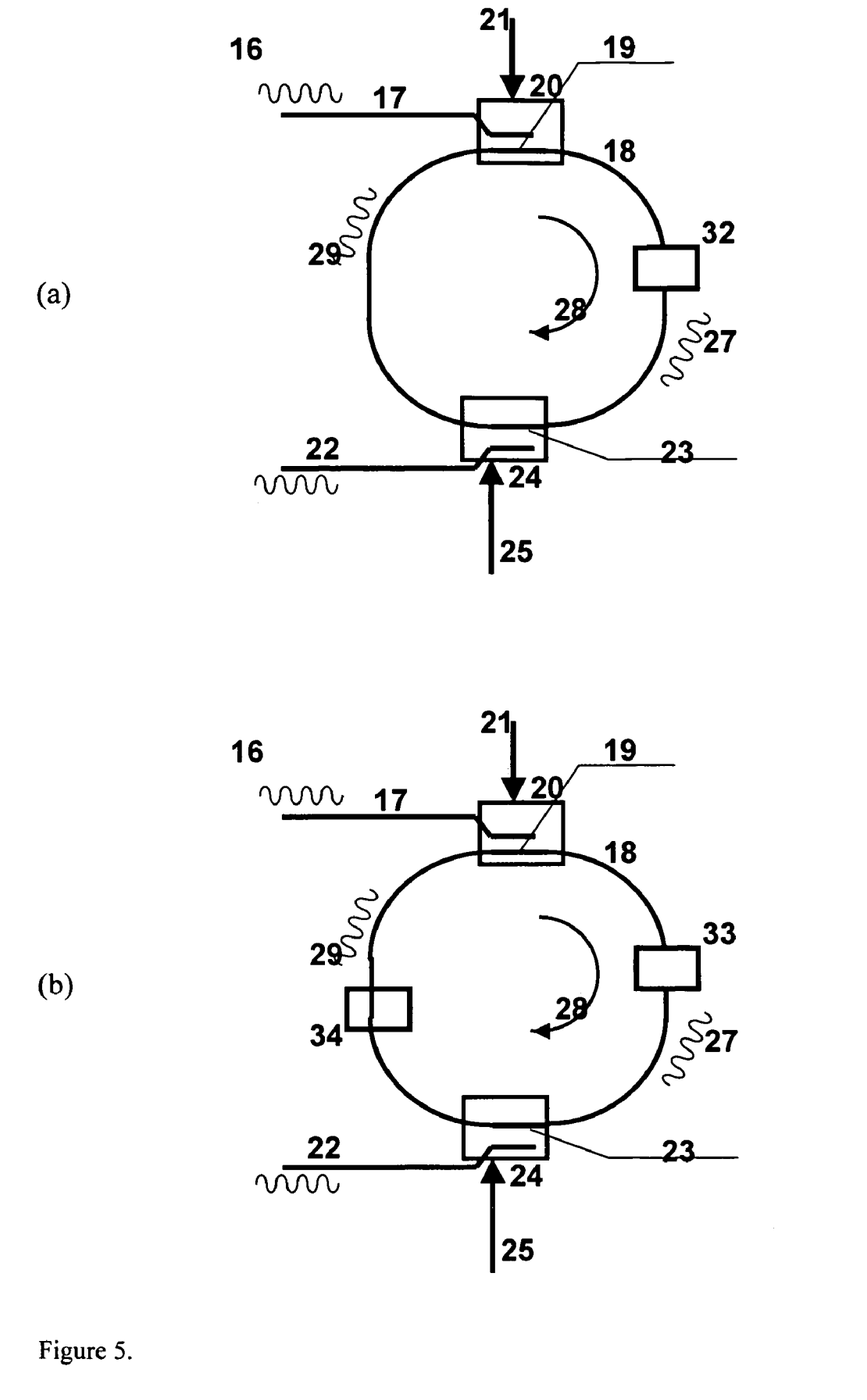
FIG. 5 is a schematic diagram illustrating one embodiment of the present invention of the integrated optical device with a phase shifter incorporated in the loop resonator with, a phase shifter consisting of one unit, and a phase shifter of two units.

In one embodiment of the present invention at least one phase shifter is integrated into the waveguide loop cavity in order to independently introduce a desired optical phase change into the propagating wave within the resonator cavity. This embodiment of the present invention is shown in FIG. 5(a) with a phase shifter 32 incorporated in the loop resonator 18. The variable phase change ΔΦ introduced by the phase shifter 32 is related to the to the values of $K_1$ and $K_2$ accordingly to the following equation $$\Delta\Phi=f\{K_2,K_2,\xi\} \text{ for } Q\{\Delta\Phi\}=\text{Max}\{Q\}, \quad (3)$$

More detailed description of the optimal choice of the phase change ΔΦ the best loop resonator performance is provided further in this specification.

The phase shifter 32 may consists of one or more than one separate units located at different positions of the loop resonator 18. FIG. 5(b) depicts the integrated optical device with a phase shifter consisted of two units 33 and 34.

In one embodiment of the present invention these separate units 33 and 34 of the phase shifter are the same, in another embodiment they are different. For example, in one embodiment the phase shifter consists of two units, one unit 33 modulates the optical phase with a frequency from 0 Hz to 1 GHz, and the second unit 34 modulates the frequency of the optical wave in 1–150 GHz range. These ranges of frequency modulation are important when creating such integrated optical elements as an optical comb generator and a modulator, described in applications further in the text.

Figure 6:
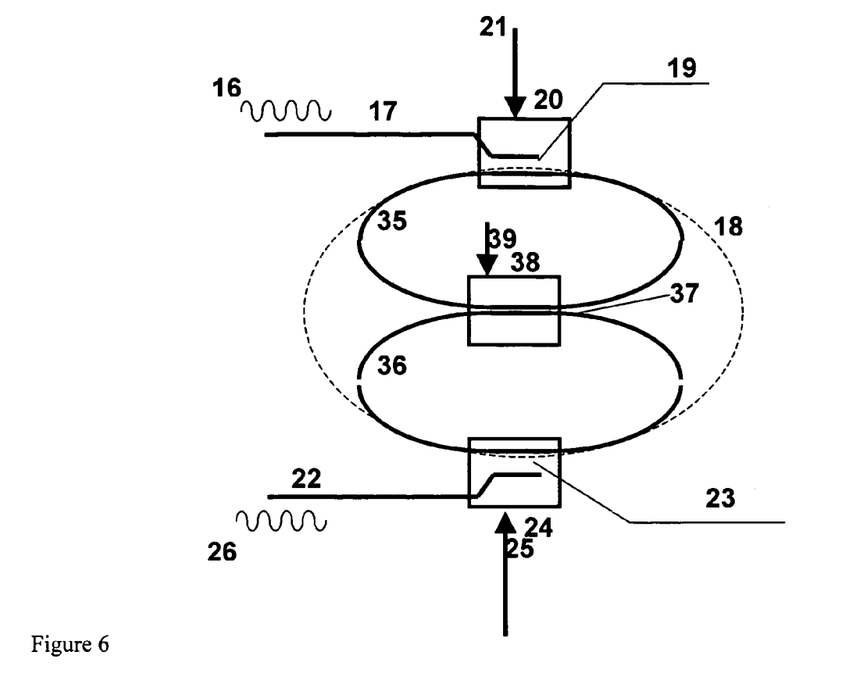
FIG. 6 is a schematic diagram illustrating one embodiment of the present invention of the integrated optical device with a loop resonator that has two rings.

In one embodiment of the present invention the loop resonator 18 comprises two or more rings coupled to each other and to input/output waveguides by couplers, each of which has its own adjustment unit to control it's own coupling ratio. FIG. 6 shows an integrated optical device with a loop resonator 18 that consists of two rings 35 and 36 coupled with the third coupler 37. The third coupler 37 has its own adjustment unit 38. A driving signal 39 is applied to the third adjustment unit 38 to change the coupling ratio $K_3$ of the third coupler 37. The value of coupling ratio $K_3$ is related on the value of $K_1$ and $K_2$ according to following equation:

$$K_3 = f\{K_1, K_2, \xi\} \text{ for } Q\{K_3\} = \text{Max}\{Q\} \tag{4}$$

An optimal value of $K_3$ one can found similar to the procedure of finding optimal value of $K_2$, disclosed further in the text.

Figure 7:
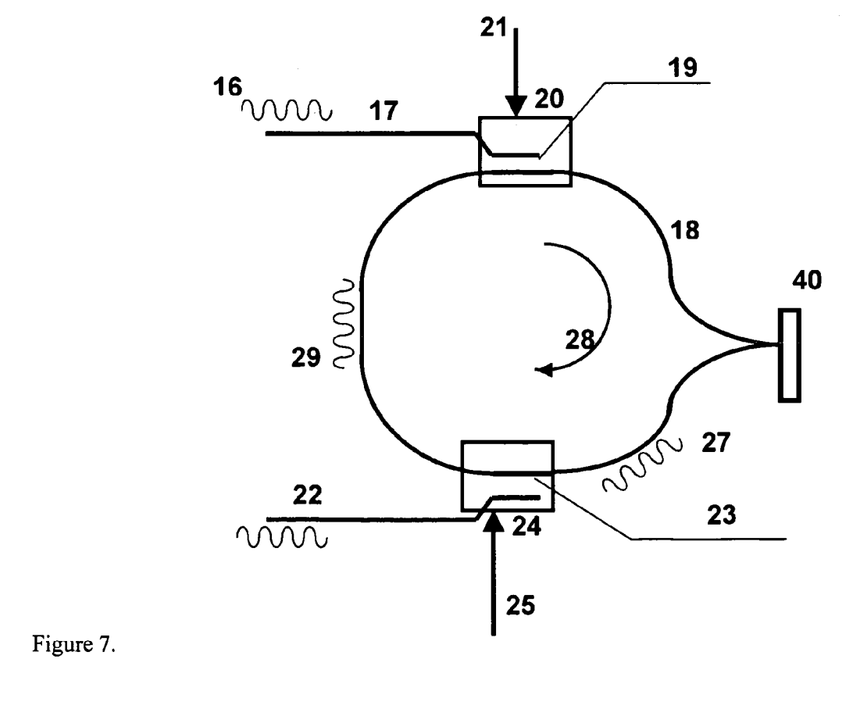
FIG. 7 is a schematic diagram illustrating one embodiment of the present invention of the integrated optical device with a reflection element.

The loop resonator 18 may incorporate at least one reflection element to make a compact integration. FIG. 7 shows a reflection element 40 incorporated in the loop resonator 18.

By way of illustration, and without limitation, in one embodiment of the present invention, the optical device is integrated in a lithium niobate electro-optical crystal, can be based on semiconductors such as GaAs, InP, Si, polymer, on silica, and the like. The present invention can be utilized for a variety of different applications, including but not limited to, lasers, optical comb generators, modulators, tunable filters and sensors based on detecting a phase change in the loop (such as of temperature sensors, material concentration sensors, angular velocity sensors (gyroscopes) and the like.)

The first 19, the second 23 and the third 37 couplers may be of the different type, selected from electro-optical, thermo-optical, acousto-optical, or opto-mechanical couplers. The first and the second couplers have different operating characteristics. The first 19, the second 23 and the third 37 couplers may be selected from regular and δβ-reversal coupler configuration, see the description of this type of couplers in, "Directional coupler switches, modulators, and filters using alternating Δβ techniques" by R. Schmidt, R. Alferness in IEEE Trans. on Circuits and Systems, Vol. 26, No. 12, pp, 1099–1108, 1979. The δβ-reversal couplers may have advantages in terms of at-resonance stabilization of the structure since they are not introducing undesired phase shift to the cavity wave.

In one embodiment of the present invention the input and the output waveguides of the disclosed integrated optical device are single mode waveguides. In another embodiment they are multiple mode waveguides.

Figure 8:
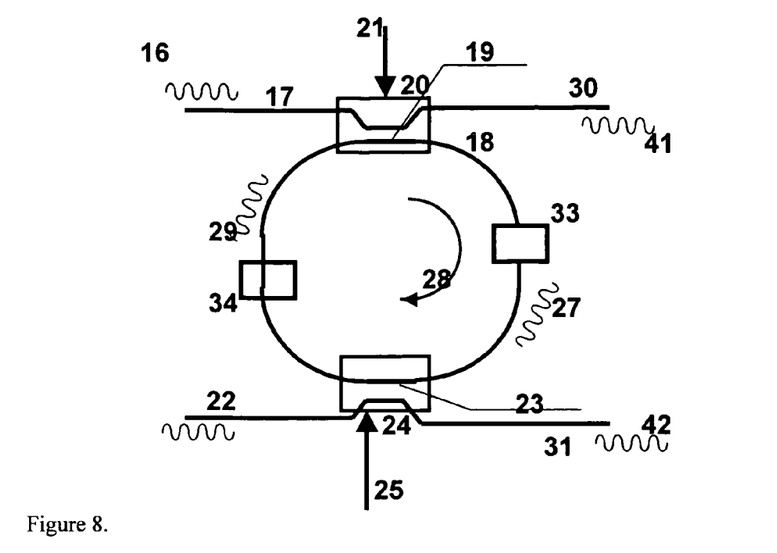
FIG. 8 is a schematic diagram illustrating one embodiment of the present invention of the integrated optical device with two input waveguides, two output waveguides and two phase shifters.

The performance of the single ring loop resonator structure shown in FIG. 8 with two input waveguides 17 and 31, two output waveguides 30 and 22, and the phase shifter consisted of two units 33 and 34 can be described by the following set of equations:

$$\begin{bmatrix} E41 \\ E27A \end{bmatrix} = G_{19} \, T_{19} \begin{bmatrix} E16 \\ E29A \end{bmatrix} \tag{5a}$$

$$E27B = h_{27} E27A \tag{5b}$$

$$\begin{bmatrix} E29B \\ E26 \end{bmatrix} = G_{23} \, T_{23} \begin{bmatrix} E27B \\ E42 \end{bmatrix} \tag{5c}$$

$$E29A = h_{29} E29B \tag{5d}$$

Fields E41 and E26 are the forward and the backward outputs of the resonator 18, respectively, and E27A, E27B, E29B, E29A are the circulating (internal) fields. E42=0 for the case of a single light input E16, and $$G_{19,23} = \sqrt{1 - \gamma_{19,23}}, \tag{6}$$

where $\gamma_{19,23}$ is the coupler insertion (lumped) losses; the indices 19, 23 denote the first and the second couplers, respectively, while indices 27 and 29 indicate right and left halves of the cavity propagation distance, respectively. $T_{19,23}$ is the coupler transfer matrix, for each coupler 19 and 23, and coefficient h is $$h_{27,29} = \exp\{-L_{27,29}\alpha\} \exp\{-j\Phi_{27,29}\}, \tag{7}$$

where α is the optical field loss coefficient within the loop and $\Phi_{27,29}$ is the propagation phase shift within segments 27 or 29 of the loop with non-uniform behavior along the propagation distance.

The coupling lengths $Lc_{19,23}$ are excluded from the propagation distance since they are described by unitary transfer operators $T_{19,23}$. For two coupled modes it can be described as follows:

$$T_{19,23} \equiv \exp(j \; L_{19,23} \; M_{19,23}) \tag{8}$$

$$= \begin{bmatrix} \rho \exp(j \; \varphi_I) & -\sqrt{1-\rho^2} \exp(-j \; \varphi_{II}) \\ \sqrt{1-\rho^2} \exp(j \; \varphi_I) & \rho \exp(-j \; \varphi_{II}) \end{bmatrix}$$

where imaginary unit real values ρ, $\phi_I$ and $\phi_{II}$ depend on the coupling coefficients $\kappa_{19,23}$, propagation constants $\beta_{19,23}$ and the tuning scheme of the coupler.

The resonant condition E41=0 (E26=max) results in $$T_{19}^{11} - G T_{23}^{11} = 0, \tag{9}$$

where upper indices are denoting the elements of matrix T of (8).

This condition can be represented differently by involving equation (8)

$$\rho_{19} \exp(j\phi_{I19}) = \xi \exp(-j\Phi) \rho_{23} \exp(j\phi_{I23}) \tag{10}$$

where (1−ξ) is the total resonator losses, Φ is the total phase shift within the cavity, and L is the length of the resonator cavity 18 of the form $$\xi = G_{19} G_{23} \exp(-\alpha L)$$

$$\Phi = \Phi_{27} + \Phi_{29} = \beta L + \Delta\beta_{27} D_{27} + \Delta\beta_{29} D_{29} \tag{11}$$

$$L = L_{27} + L_{29}$$

Parameters $\phi_{I\,19}$ and $\phi_{I\,23}$ depend on a particular external perturbation model of the couplers 19 and 23, respectively, as discussed below. Equation (10) imposes following important condition on structure parameters:

$$\begin{cases} \rho_{19} = \xi \rho_{23} \\ \Phi = \varphi_{123} - \varphi_{119} + 2\pi n, \quad n\text{-integer} \end{cases} \quad (12)$$

the following dimensionless parameters can be introduced for each coupler:

$$K_{19,23} = \kappa_{19,23} Lc_{19,23}, \; B_{19,23} = \delta\beta_{19,23} Lc_{19,23}, \; H_{19,23} Sqrt(K_{19,23}^2 + B_{19,23}^2) \quad (13)$$

where $Lc_{19,23}$ and $\kappa_{19,23}$ are corresponding effective lengths and coupling coefficients for the couplers 19 and 23 respectively, and $\delta\beta_{19,23}$ is the external perturbation of the modes propagation constant within the couplers.

Equation (10) gives a general way of establishing relation between coupling values $K_1$ and $K_2$ as well as a value of corresponded resonator phase. This relation defines general resonator parameters that are necessary for desired (optimized) resonator output.

The scheme with two passive couplers 19 and 23 is considered below. Without tuning, e.g. with no perturbation applied to couplers and $B_{19,23} = \delta\beta_{19,23} = 0$; $H_{19,23} = K_{1,2}$, equation (12) can be rewritten:

$$\cos(K_{19}) = \pm \xi \cos(K_{23}) \quad (14a)$$

$$\Phi = 2\pi m, \; m\text{-integer} \quad (14b)$$

It can be noted that this result depends only on length-normalized coupling and a generic loss factor, while independent of the specific details of a resonator cavity. This form resembles the basic Fabry-Perot etalon relations with mirrors of, generally, different reflectivity. Analysis of equations (14) leads to different possible cases of the resonator performance, which can be better understood by using the critical coupling (resonance) diagram shown in FIG. 9. The dash-lines on the diagram correspond to particular cases of the loop without losses, i.e. with $\xi = 1$. Such resonators with identical couplers are well described in previous art, see, for example see, B. E. Little and Sai T. Chu, "Theory of loss and gain trimming of resonator-type filters", IEEE Photonics Technol. Lett., Vol. 12, No. 6, pp. 636–638, 2000.

Figure 9:
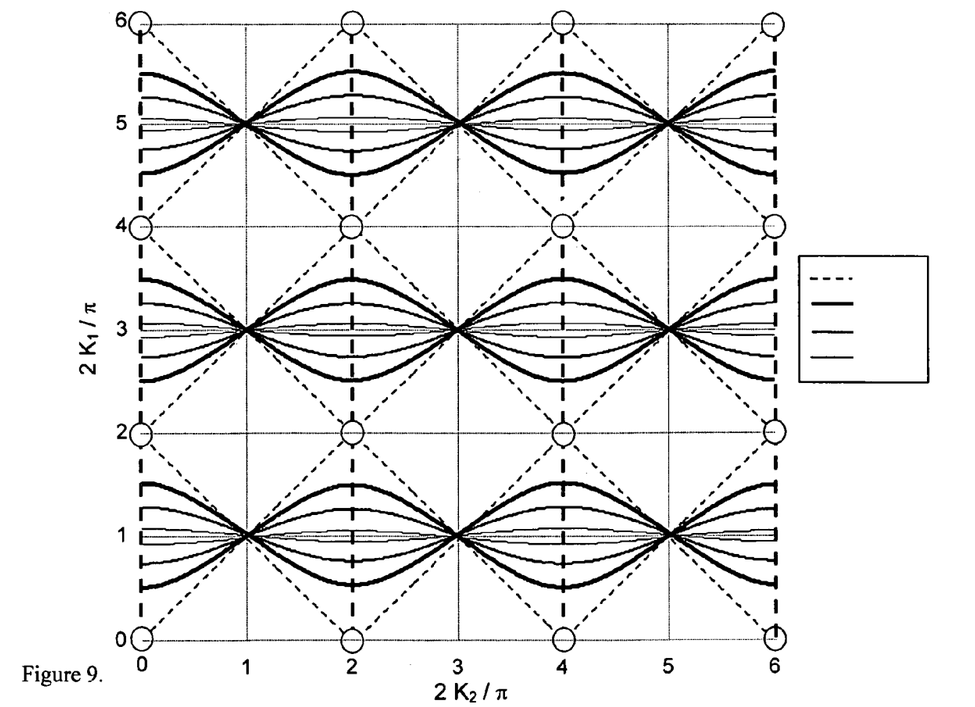
FIG. 9 is a diagram illustrating one embodiment of the critical coupling (resonance) diagram of the present invention.

As it can be seen from diagram, equation (14a) implies that, apart from the trivial solution $\cos(K_{19}) = \cos(K_{23}) = 0$, a complete resonance condition (E41=0) is not achievable when both couplers are identical and losses in the resonator are not negligible.

Figure 10:
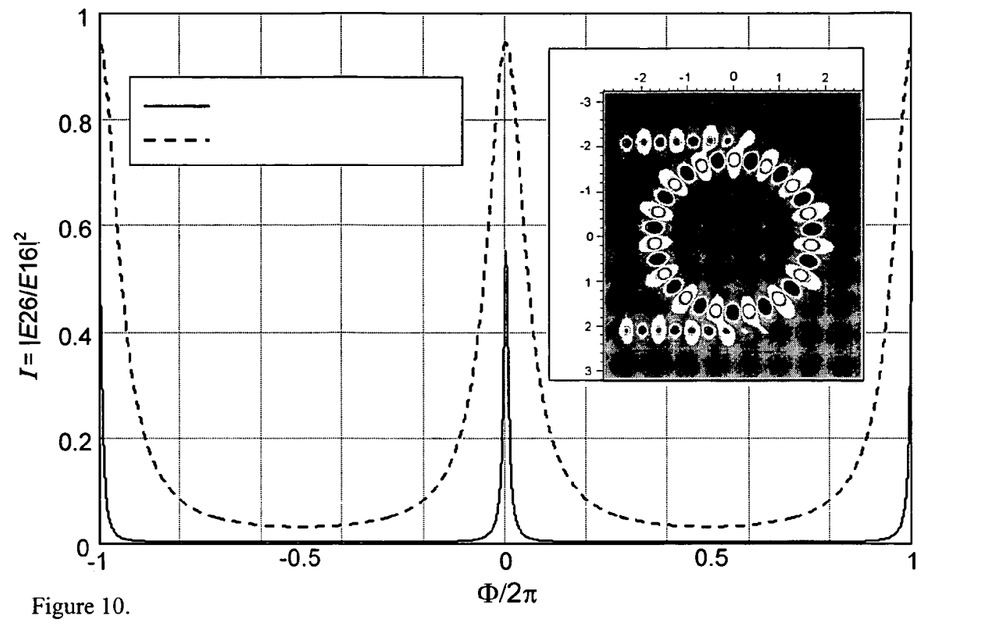
FIG. 10 is a diagram illustrating one embodiment of the coupled mode theory (CMT) simulated, resonator responses (two different devices), of the present invention, designed for better quality factor (solid line) and maximum contrast (dashed line) for ξ=0.99; inlay with FDTD (finite-difference time-domain) simulation for Φ=0.

Typically, at least two optimal coupling 19 values exist for each optimal passive coupling 23 value within the constraints of a feasible couplers design. FIG. 10 shows a typical performance of a resonator with such coupling parameters.

Another embodiment of the present invention utilizes a single passive coupler as a particular case of the disclosed device. The degraded case of resonant condition E41=0 can be achieved with the first coupler 19 defined accordingly to (14)

$$K_{19} = \alpha \cos(\pm \xi) \quad (15a)$$

$$\Phi = \beta L = 2\pi m, \; m\text{-integer} \quad (15b)$$

Figure 11:
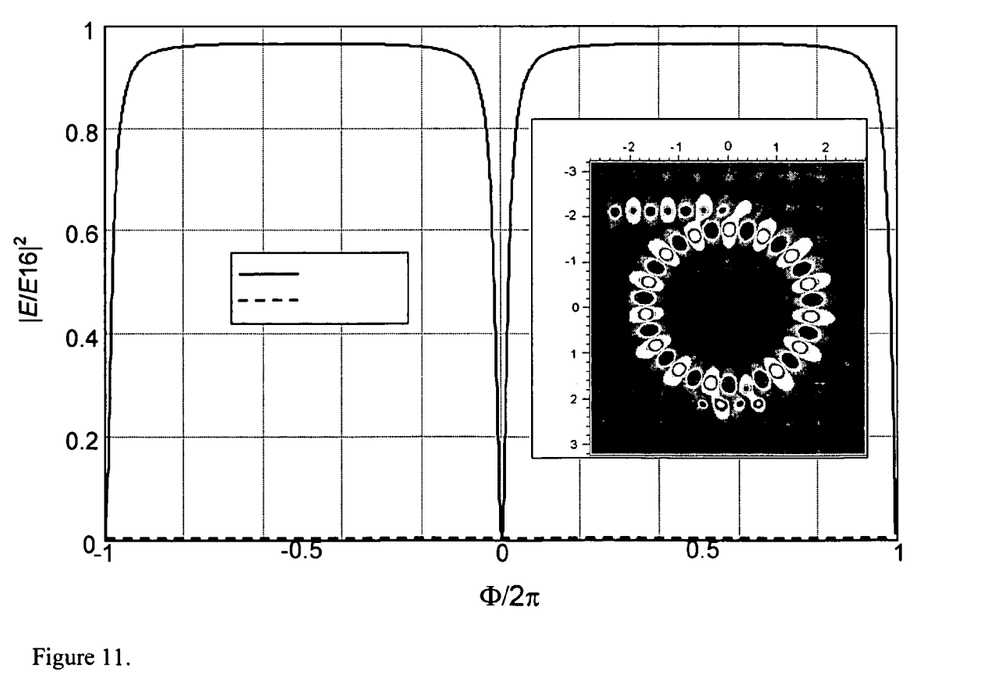
FIG. 11 is a diagram illustrating one embodiment of resonator simulation for degraded solution with different couplers of the present invention that has inlay with resonator fields for Φ=0.

Simulation of the resonator described by equations (15) is shown in FIG. 11. The case with m=0 in (15) describes widely used in previous art resonator structure with single coupler, i.e. when $K_2 = 0$, see, for example, "Whispering-gallery-mode electro-optic modulator and photonic micro-wave receiver" by V. S. Ilchenko, A. Savchenkov, A. B. Matsko, and L. Maleki, J. Opt. Spc. Am. B, Vol. 20, No. 2, pp. 333–342, 2003.

A critical coupling condition, when internal resonator losses and coupling values are matched for general resonator-waveguide system, is defined by equations (14)–(15). This condition can be tuned by adjustable coupling elements in embodiment with two active couplers 19 and 23. Such elements can be realized in different ways.

Figure 12:
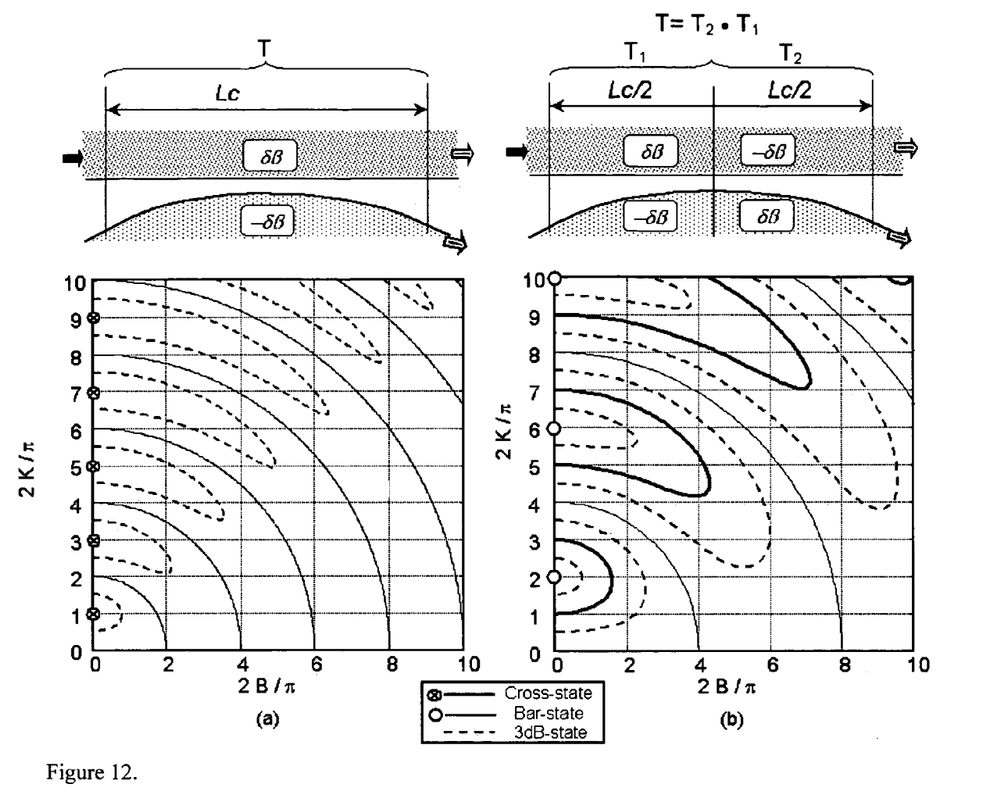
FIG. 12 is a tuning diagram for a conventional coupler and a δβ-reversal coupler of the present invention.

The most typical configurations for a coupler's external tuning are 1) regular coupler and, 2) $\delta\beta$-reversed coupler. The tuning diagram for these two types of couplers is shown in FIG. 12 with matrix T defined by (8). Here $T_1$ and $T_2$ are coupler transfer matrices for any two couplers. The diagram shows the cross (complete transfer energy from one channel to another) and bar states (remaining energy in the same channel) as a function of coupling K and applied external perturbation B.

Applying perturbations to the couplers distorts the resonator diagram of FIG. 9. Thus, if only the second coupler 23 is adjustable and $B_{19} = 0$, the resonator condition is not periodical with respect to the $K_2$ value, as it is for the passive regime.

Applying perturbation to the regular coupler requires additional phase correction within the resonator cavity. Contrary to the regular coupler, the $\delta\beta$-reversal coupler does not require additional phase adjustment.

Figure 13:
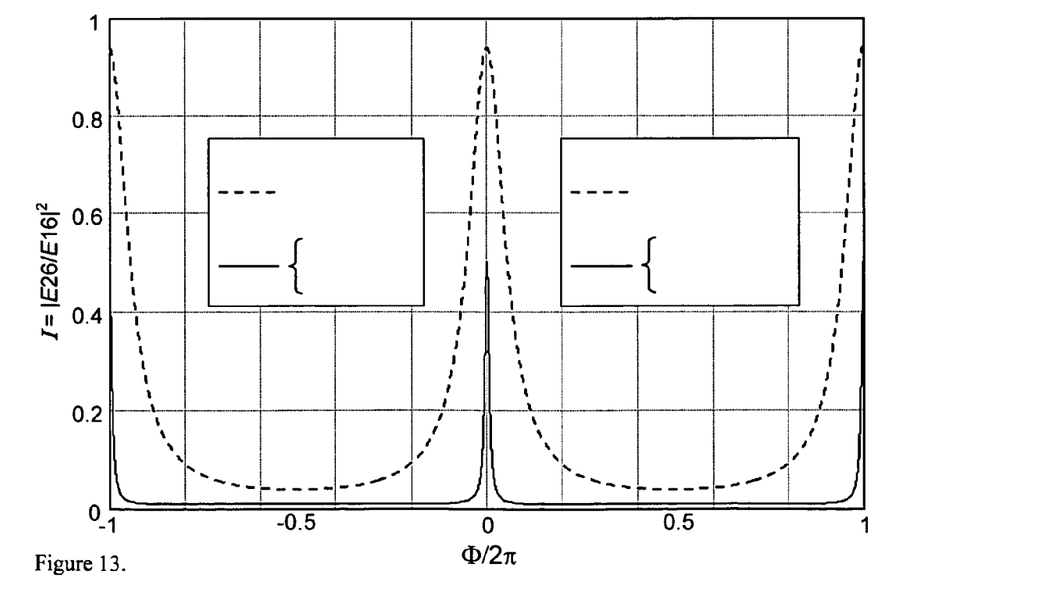
FIG. 13 illustrates a simulated response for one embodiment of the resonator of the present invention, with the fixed passive coupling values $K_{1,2}$ (same passive device) designed for better quality-factor (solid line) and maximum contrast (dashed line). Different values of applied perturbations are shown for two types of couplers. $K_2=2n\pm0.36\pi/2$; ξ=0.99.

FIG. 13 illustrates the performance of the same device (with fixed passive values of the couplings $K_{19,23}$) for different applied perturbations $B_{19,23}$. It proves that the same device can be optimized by external tuning either for optimal Q-factor or for optimal contrast value, for example.

Various applications of the disclosed technology include lasers, optical comb generators, modulators, tunable filters and sensors based on detecting of a phase change in the loop such as of temperature sensors, material concentration sensors, angular velocity sensors (gyroscopes) and others.

EXAMPLE 1

An Optical Frequency Comb Generator (OFCG) can be realized in one embodiment of the invention. OFCG consists of a central optical frequency carrier having a set of equally spaced sidebands on either side. The sidebands must be equally spaced if the optical frequency comb is to be phase coherent. The spacing between the sidebands is determined by the frequency of the RF or microwave signal that modulates the optical carrier.

The phase modulation sidebands must be resonant with the optical cavity modes, hence the term resonant electro-optic modulation, and this condition is met if the modulation frequency is equal to an integer multiple of the optical cavity free spectral range (FSR). Therefore the modulation frequency is in the microwave domain, and the highest practical modulation frequency (10 GHz to 30 GHz) is used because one wishes to achieve the largest OFCG span with the least number of sidebands to reduce the noise. The intensity of the sidebands is determined by the coupling between the cavity modes, and this is proportional to the single pass modulation index through the electro-optic modulator (m) and the optical cavity quality factor. The electric field of the optical frequency comb can be expressed as the sum of individual optical frequencies. The comb span of an OFCG is usually a few THz, but spans as wide as 10 THz have been achieved using monolithic devices where the mirrors are coated onto the electro-optic crystal.

As it was shown, WG-OFCGs are usually based on an intra-cavity electro-optical modulator. OFCG based on integrated cavity can be relatively small in size and electro-optically adjustable. Such devices can produce a picosecond or even sub-picosecond optical pulses. The repetition rate of pulses may be very high and, unlike to an active mode-locked laser, it's equal twice the RF modulation frequency. The operation frequency is determined by the pump laser, so short optical pulses can be produced in a relatively broad range of wavelength using the same device.

Electro-optical modulator based on the ring cavity may produce a comb of optical harmonics in the same fashion as conventional (Fabri-Perot etalon based) comb, providing additional degrees of freedom in terms of electro-optical control and stabilization. The corresponding ring cavity length is as twice as of the conventional OFCG, making it less sensitive to resonance mismatch of different kind.

EXAMPLE 2

The improvement in the selective diffusion of Er ions has resulted in new integrated devices based on optical amplification. A great deal of effort has been made in realizing optically pumped Er-doped LiNbO lasers, see for example "Advanced Ti:Er:LiNbO3 Waveguide Lasers", by C. Becker et al. in IEEE J. Selected Topics Quantum Electron., vol. 6, No.1 pp. 101–113, September 2000. Incorporation of a gain element in the resonant loop 18 of the disclosed integrated device allows creating of an efficient narrowband laser with adjustable characteristics. A two-coupler-type Er-doped-fiber ring resonator can compensates for the round-trip optical loss by optical amplification thereby attaining a high finesse. Their performance can be flexibly tailored and the quality factor is adjustable by the tuning of couplings 19 and 23 along with the trimming of the gain of the optical amplifier.

Figure 14:
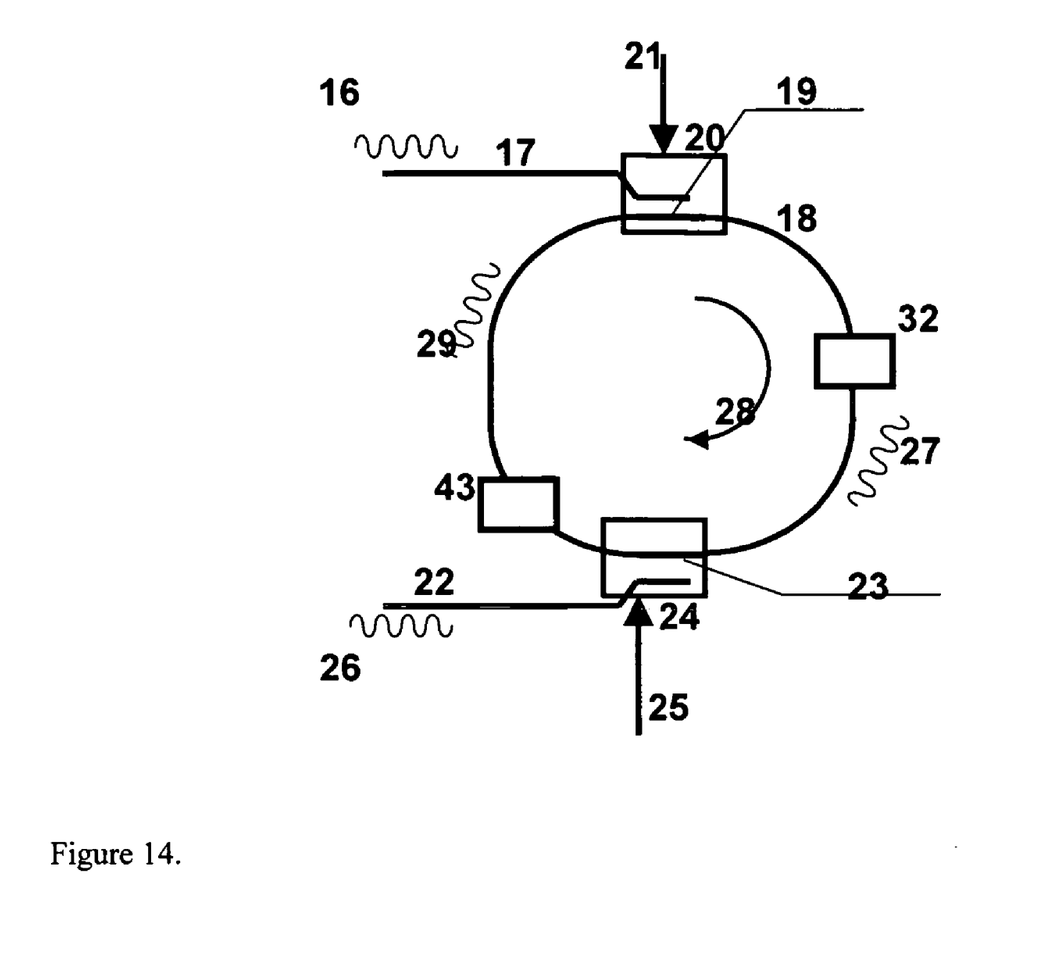
FIG. 14 is a schematic diagram illustrating one embodiment of the present invention of the integrated optical device with a gain element incorporated in it.

FIG. 14 depicts the basic scheme for laser beam generation using the loop resonator integrated device disclosed in the present invention. A gain element is introduced in the loop resonator 18 thus providing a resource for laser emission.

The optimal value of coupling ratio $K_2$ depends on the value of $K_1$ according to the following equation:

$$K_2 = f\{K_1, \xi(Pump)\}, \text{ providing } Q\{K_2\} = Max\{Q=, \tag{16}$$

EXAMPLE 3

Efficient high-speed electro-optic amplitude modulators can be realized using the disclosed invention. External modulators have proved more challenging with respect to power efficiency and high frequency. Currently, the most efficient modulators demonstrated in the laboratory are of the traveling wave type, and require half-wave voltages (Vpi) in excess of several volts while generally limited to frequencies about 50 GHz. The use of ring resonators as modulators can have substantial, orders of magnitude, improvement in efficiency and result in significant impact on the-technology of optical information generation and transfer, in commercial and specialized government systems.

Proposed invention enables further improvement of the voltage efficiency of the external modulation while extending the frequency of modulation to above 100 GHz, in a small device. Thus extinction ratio and Vpi, can be adjusted by tuning of resonator couplers ratios $K_1$ and $K_2$ along with phase-shifters 33 and 34. In addition, the waveguide modes of the preferred embodiment are matched the to that in the optical fiber thus reducing the insertion losses.

EXAMPLE 4

The methods and systems of the present invention allow creating of an integrated resonator cavity with improved selectivity characteristics. Tight channel spacing in wavelength-division-multiplexed (WDM) systems require optical for filters that exhibit a very narrow response. Coupled microrings have been suggested for add-drop filter applications, see for example B. E. Little, et al. "Very High-Order Microring Resonator Filters for WDM Applications", IEEE Photonics Technology Letters., vol.16, No.10 pp. 22632265, September 20040.

However, the manufacturing yield requirements as well as filters specification often require technology to produce a specific (tunable) spectral performance. The quality of the response of the existing filters is predefined and not tuned once the device is fabricated. The ability to go further to readily tunable filter characteristics based on efficient tuning of the loop resonator couplers. The optimal value of $K_2$ depends on the value of $K_1$ according to the following equation:

$$K_2 = f\{K_1, \xi, \lambda\}, \text{ providing } Q\{K_2\} = Max\{Q\}, \tag{17}$$

where $\lambda$ is the operating (desired) wavelength.

EXAMPLE 5

In one embodiment of the present invention, integrated optical low-cost high yield technology is utilized for tunable sensors based on passive integrated loop resonators. The implementing of high-finesse, microcavity devices for high-sensitivity biosensors and optical gyroscopes was disclosed, for example, in R. W. Boyd and J. E. Heebner, "Sensitive disk resonator photonic biosensor", Applied Optics, Vol. 40, No. 31, pp. 5742–5747, 2001 and in M. N. Armenise, et al., "Modeling and Design of a Novel Miniaturized Integrated Optical Sensor for Gyroscope Systems", *IEEE J. of Lightwave Technology*, Vol. 19. N 10, 1476–1494, 2001.

The tunable sensitivity as well as stabilization control loop of such interferometeric tunable sensors can be achieved by utilizing proposed invention of integrated loop resonators fabrication with tunable couplers and phase. The optimal value of $K_2$ depends on the value of $K_1$ according to the following equation:

$$K_2 = f\{\chi\}, \text{ providing } Q\{K_2\} = Max\{Q\}, \tag{X}$$

where $\chi$ is the parameter under investigation.

Such technology potentially overcomes the limitations of analogous commercially available sensors in various aspects, for example, in size, accuracy, sensitivity, durability, and manufacturing cost. Example of such sensors include Integrated Optical Gyroscopes, Integrated optical microphones/hydrophones, Integrated current sensors, Integrated impact (vibration) sensor. Inherently reciprocal optical scheme eliminates most of problems associated with the existing solutions, for example, coupler instability, polarization walk-off, back reflections. Advantages are: Active adjustment of dynamic range and drift through cavity phase control; High measurement sensitivity; Shock and vibration immunity (no moving parts); Compact optical/electrical package; Low power consumption; high-yield technology due to electro-optical tuning.

The description of the embodiments of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An integrated optical device, comprising:
   a loop resonator with at least one closed waveguiding loop, the loop resonator having losses;
   a coupler coupled to the loop resonator;
   at least one input waveguide coupled with a first coupler to the loop resonator;
   a first adjustment unit to control a coupling coefficient $K_1$ of the first coupler;
   a second coupler coupled to the loop resonator; and
   at least one output waveguide coupled with the second coupler to the loop resonator,
   the second adjustment unit configured to control a coupling coefficient $K_2$ of the second coupler, being related to the value of $K_1$, accordingly to the following equation $$K_2 = f\{K_1, \xi\}, \text{ providing } Q\{K_2\} = \text{Max } \{Q\},$$

where $(1-\xi)$ are the total optical losses within the loop resonator and Q is a resonator characteristic.

2. The integrated optical device of claim 1, wherein the resonator characteristic Q is selected from at least one of, a resonator contrast, a resonator quality-factor, a resonator finesse, and a spectral line-width.

3. The integrated optical device of claim 1, wherein the first and the second couplers are of different types, and selected from at least one of, electro-optical, thermo-optical, acousto-optical, and opto-mechanical couplers.

4. The integrated optical device of claim 1, wherein the first and the second couplers have different operating characteristics.

5. The integrated optical device of claim 1, further comprising:
   a phase shifter incorporated in the loop resonator, the phase shifter configured to introduce a variable optical phase change $\Delta\Phi$ into a wave, propagating within the loop resonator.

6. The integrated optical device of claim 5, wherein the variable phase change $\Delta\Phi$ is related to the to the values of $K_1$ and $K_2$ accordingly to the following equation $$\Delta\Phi = f\{K_2, K_2, \xi\} \text{ for } Q\{\Delta\Phi\} = \text{Max}\{Q\}.$$

7. The integrated optical device of claim 4, wherein the phase shifter is one or more than one separate units located at different positions of the loop resonator.

8. The integrated optical device of claim 7, wherein the separate units of the phase shifter are the same.

9. The integrated optical device of claim 7, wherein the separate units of the phase shifter are different.

10. The integrated optical device of claim 7, wherein at least one phase shifter is a modulator with operating frequency from 0 Hz to 1 GHz.

11. The integrated optical device of claim 7, wherein at least one phase shifter is a modulator with operating frequency from 1 GHz to 150 GHz.

12. The integrated optical device of claim 7, wherein at least one phase shifter is a traveling-wave type of electro-optical modulator.

13. The integrated optical device of claim 7, wherein at least one phase shifter is a resonator type of electro-optical modulator.

14. The integrated optical device of claim 4, wherein the phase shifter is at least one modulator selected from, electro-optical, thermo-optical, acousto-optical and opto-mechanical.

15. The integrated optical device of claim 1, wherein the loop resonator includes two rings coupled to each other with a third coupler.

16. The integrated optical device of claim 15, further comprising a third adjustment unit to control the coupling parameter of the third coupler and having a value $K_3$ according to following equation:

$$K_3 = f\{K_1, K_2, \xi\} \text{ for } Q\{K_3\} = \text{Max}\{Q\}.$$

17. The integrated optical device of claim 1, wherein the loop resonator includes N rings coupled to each other with (N-1) couplers and N is an integer number larger than 3.

18. The integrated optical device of claim 1, wherein the loop resonator includes at least one reflection element.

19. The integrated optical device of claim 1, wherein the integrated optical device is integrated in a lithium niobate electro-optical crystal.

20. The integrated optical device of claim 1, wherein the integrated optical device is integrated in a lithium tantalite electro-optical crystal.

21. The integrated optical device of claim 1, wherein the integrated optical device is integrated in a material with optical gain.

22. The integrated optical device of claim 1, wherein the integrated optical device is integrated in a semiconductor material selected from GaAs, InP, and Si.

23. The integrated optical device of claim 1, wherein the integrated optical device is integrated on silica.

24. The integrated optical device of claim 1, wherein the integrated optical device is configured to produce an output wave with a set of frequencies equidistantly apart from each other.

25. The integrated optical device of claim 1, wherein the integrated optical device is configured to produce a laser output.

26. The integrated optical device of claim 1, wherein the integrated optical device is configured to produce a modulated output light.

27. The integrated optical device of claim 1, wherein the integrated optical device is configured to produce a tunable filtering of light.

28. The integrated optical device of claim 1, wherein the integrated optical device is configured to produce a sensing of at least one external parameter.

29. The integrated optical device of claim 28, wherein the external parameters include at least one of, temperature, material concentration and angle velocity of an interrogated object.

30. A method for creating an integrated optical device, comprising:
   providing a loop resonator that has losses;
   coupling the loop resonator to an input and output waveguides with a first and a second couplers;
   incorporating a first and second adjustment units to the first and the second couplers;
   driving the first and the second adjustment units independently;
   driving the second adjustment unit to control a coupling coefficient $K_2$ of the second coupler, being related to the value of a coupling coefficient $K_1$ of the first coupler, accordingly to the following equation $$K_2 = f\{K_1, \xi\}, \text{ providing } Q\{K_2\} = \text{Max}\{Q\},$$

where $(1-\xi)$ are the total optical losses within the loop resonator and Q is a resonator characteristic.

31. The method of claim 30, wherein the resonator characteristic Q is selected from at least one of, a resonator contrast, a resonator quality-factor, a resonator finesse, and a spectral line-width.

32. The method of claim 30, further comprising:
integrating the gain element in the loop resonator; and
maximizing the characteristic Q for the laser beam generation output.

33. The method of claim 30, wherein characteristic Q is maximized for the filtering of the optical beam with a predetermined spectral selectivity.

34. The method of claim 30, further comprising: integrating at least one phase shifter in the loop resonator.

35. The method of claim 34, wherein the characteristic Q is maximized for generation of modulated light beam output.

36. The method of claim 34, wherein characteristic Q is maximized for generation of an output with a set of optical frequencies equidistantly apart from each other.

37. The method of claim 34, wherein characteristic Q is maximized for generation of an optical output with an optical phase encoded with the information on at least one external parameter.

38. The method of claim 30, wherein the external parameters include at least one of, temperature, material concentration and angle velocity of an interrogated object.

* * * * *